United States Patent
Shin

(10) Patent No.: US 11,046,301 B2
(45) Date of Patent: Jun. 29, 2021

(54) SYSTEM AND METHOD FOR CONTROLLING CHARGING TORQUE OF HYBRID VEHICLE

(71) Applicants: HYUNDAI MOTOR COMPANY, Seoul (KR); KIA MOTORS CORPORATION, Seoul (KR)

(72) Inventor: Dong Jun Shin, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 249 days.

(21) Appl. No.: 16/387,905

(22) Filed: Apr. 18, 2019

(65) Prior Publication Data

US 2020/0189558 A1 Jun. 18, 2020

(30) Foreign Application Priority Data

Dec. 12, 2018 (KR) .................. 10-2018-0160015

(51) Int. Cl.
*B60W 20/10* (2016.01)
*B60W 10/08* (2006.01)
*B60W 10/06* (2006.01)

(52) U.S. Cl.
CPC ............ *B60W 20/10* (2013.01); *B60W 10/06* (2013.01); *B60W 10/08* (2013.01); *B60W 2510/0657* (2013.01); *B60W 2510/083* (2013.01); *B60W 2510/087* (2013.01)

(58) Field of Classification Search
CPC ...... B60W 20/10; B60W 20/15; B60W 10/08; B60W 10/06; B60W 2510/087; B60W 2510/0657; B60W 2510/083; B60W 2710/083; B60W 30/1843; B60K 6/442; Y02T 10/70

See application file for complete search history.

(56) References Cited

U.S. PATENT DOCUMENTS

| 6,209,672 B1 * | 4/2001 | Severinsky ........... B60W 10/08 180/65.23 |
| 2017/0137016 A1 * | 5/2017 | Yang ..................... B60W 10/08 |
| 2020/0207328 A1 * | 7/2020 | Adachi ................. B60L 3/0061 |

FOREIGN PATENT DOCUMENTS

| JP | 2008-247155 | * 10/2008 |
| KR | 10-2018-0068023 A | 6/2018 |

* cited by examiner

*Primary Examiner* — Michael J Zanelli
(74) *Attorney, Agent, or Firm* — Morgan, Lewis & Bockius LLP

(57) ABSTRACT

A system for controlling a charging torque of a hybrid vehicle may include: a first motor connected to an engine and configured to charge an energy storage system using a first charging torque generated from the engine; a second motor connected to the engine and configured to charge the energy storage system using a second charging torque generated from the engine; a plurality of sensors respectively sensing operation states of the first motor and the second motors; and a controller configured to obtain an entire charging torque generated from the engine and to determine distribution amounts of the first charging torque and the second charging torque from the entire charging torque or to adjust the entire charging torque according to the operation states of the first motor and the second motor.

11 Claims, 6 Drawing Sheets

SYSTEM AND METHOD FOR CONTROLLING CHARGING TORQUE OF HYBRID VEHICLE

CROSS REFERENCE TO RELATED APPLICATION

The present application claims the benefit of priority to Korean Patent Application No. 10-2018-0160015, filed on Dec. 12, 2018 with the Korean Intellectual Property Office, the entire contents of which is incorporated herein for all purposes by this reference.

TECHNICAL FIELD

The present disclosure relates to a system and method for controlling charging torque of a hybrid vehicle, the system and method being able to improve charging efficiency, prevent overheating of a motor, and stably perform charging even if the motors are overheated.

BACKGROUND

Hybrid vehicles are equipped with an internal combustion engine (ICE), a plurality of electric motors, an energy storage system (ESS), etc., and optimally distribute and store charging energy generated by the ICE to the ESS using the electric motors while the vehicles are accelerated or driven at constant speeds.

Common hybrid vehicles use only a driving motor of two electric motors when storing redundant power except for power for driving of the power generated by an ICE while the hybrid vehicles are accelerated or driven at constant speeds.

In the related art, energy flow for charging during driving is made in the order of fuel, ICE, motor system (motor and inverter), and ESS. In this process, the amount of charging torque of the driving motor that is distributed even for charging the ESS of ICE output torque is dependently determined by the value of (ICE torque–driver's requested torque). Accordingly, a target charging torque value of a motor is dependently determined, as described above, on an efficiency map determined by torque and rpm, so it is basically impossible to perform control for selecting the target charging torque value in a period with excellent efficiency.

The description provided above as a related art of the present disclosure is just for helping understanding the background of the present disclosure and should not be construed as being included in the related art known by those skilled in the art.

The information disclosed in this Background of the Invention section is only for enhancement of understanding of the general background of the invention and may not be taken as an acknowledgement or any form of suggestion that this information forms the prior art already known to a person skilled in the art.

SUMMARY

Various aspects of the present disclosure are directed to providing a system and a method for controlling charging torque of a hybrid vehicle. The system and method according to the various aspects of the present disclosure can improve charging efficiency, prevent overheating of a motor, and stably perform charging even if the motors are overheated.

According to various aspects of the present disclosure, a system for controlling a charging torque of a hybrid vehicle may include: a first motor connected to an engine and configured to charge an energy storage system using a first charging torque generated from the engine; a second motor connected to the engine and configured to charge the energy storage system using a second charging torque generated from the engine; a plurality of sensors respectively sensing operation states of the first motor and the second motors; and a controller configured to obtain an entire charging torque generated from the engine and to determine distribution amounts of the first charging torque and the second charging torque from the entire charging torque or to adjust the entire charging torque according to the operation states of the first motor and the second motor.

The first motor may be disposed on a driving shaft of the vehicle and may be connected to the engine through a clutch.

The entire charging torque may be a value obtained by subtracting a driving torque for driving the vehicle from an engine torque generated from the engine and may be a summation of the first charging torque and the second charging torque.

The plurality of sensors may sense temperatures of the first motor and the second motor, respectively, and the controller may be configured to determine the distribution amounts of the first charging torque and the second charging torque or may adjust the entire charging torque according to the temperatures of the first motor and the second motor.

When a temperature of the first motor exceeds a first predetermined reference, the controller may be further configured to determine the distribution amounts such that the first charging torque decreases and the second charging torque increases.

When a temperature of the first motor exceeds a first predetermined reference, the controller may be further configured to reduce the first charging torque by a first derating factor and to increase the second charging torque by the reduced first charging torque.

When a temperature of the second motor exceeds a second predetermined reference, the controller may be further configured to determine the distribution amounts such that the second charging torque decreases and the first charging torque increases.

When a temperature of the second motor exceeds a second predetermined reference, the controller may be further configured to reduce the second charging torque by a second derating factor and to increase the first charging torque by the reduced second charging torque.

When temperatures of the first motor and the second motor exceed first and second predetermined references, respectively, the controller may be further configured to reduce the entire charging torque.

When temperatures of the first motor and the second motor exceed first and second predetermined references, respectively, the controller may be further configured to reduce the first charging torque by a first derating factor, to reduce the second charging torque by a second derating factor, and to reduce an engine torque by the reduced first charging torque and second charging torque.

When the controller determines that the operation states of the first motor and the second motor are in a good operation state, the controller may be further configured to calculate a first difference value that is a difference value between a first maximum efficiency according to an RPM of the first motor and an efficiency of the first motor, to calculate a second difference value that is a difference value between a second maximum efficiency according to an RPM of the second motor and an efficiency of the second motor, and to determine the first charging torque and the second charging torque such that a summation of the first difference value and the second difference value is minimal. The good operation state may include an operation state where temperatures of the first and second motors are below or equal to the first and second predetermined references, respectively.

In view of another aspect, a method of controlling a charging torque of a hybrid vehicle using the system for controlling charging torque of a hybrid vehicle of the present disclosure may include: obtaining an entire charging torque generated from an engine; sensing an operation state of a first motor; sensing an operation state of a second motor; and determining distribution amounts of first charging torque and second charging torque from the entire charging torque or adjusting the entire charging torque on the basis of the operation states of the first motor and the second motor.

According to the system and method of controlling charging torque of a hybrid vehicle of the present disclosure, it is possible to improve charging efficiency, prevent overheating of motors, and stably perform charging even if the motors are overheated.

BRIEF DESCRIPTION OF THE DRAWINGS

The system and method of the present disclosure have various aspects, features and advantages which will be apparent from or are set forth in more detail in the accompanying drawings and the following Detailed Description, which together serve to explain certain principles of the present disclosure. The accompanying drawings are as follows.

Figure 1:
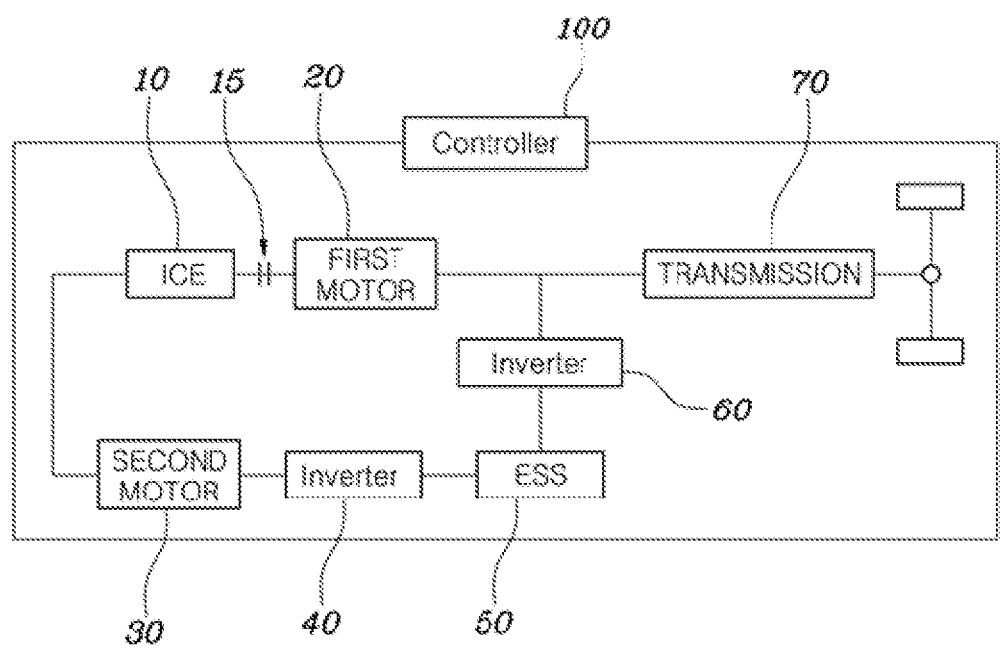
FIG. 1 is a diagram showing a system for controlling charging torque of a hybrid vehicle according to an exemplary embodiment of the present disclosure.

It may be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure, examples of which are illustrated in the accompanying drawings and described below. While the inventive concept(s) will be described in conjunction with exemplary embodiments of the present disclosure, it will be understood that the present description is not intended to limit the inventive concept(s) to those exemplary embodiments. On the other hand, the inventive concept(s) is/are intended to cover not only the exemplary embodiments of the present disclosure, but also various alternatives, modifications, equivalents and other embodiments, which may be included within the spirit and scope of the inventive concept(s) as defined by the appended claims.

Figure 2:
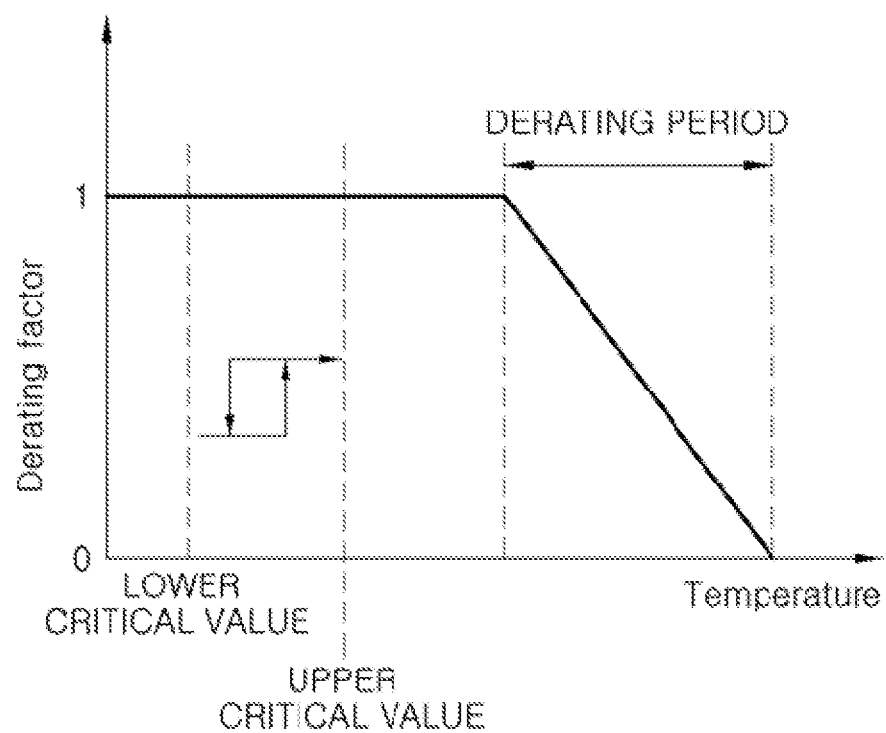
FIG. 2 is a graph showing a system for controlling charging torque of a hybrid vehicle according to an exemplary embodiment of the present disclosure.
Figure 3:
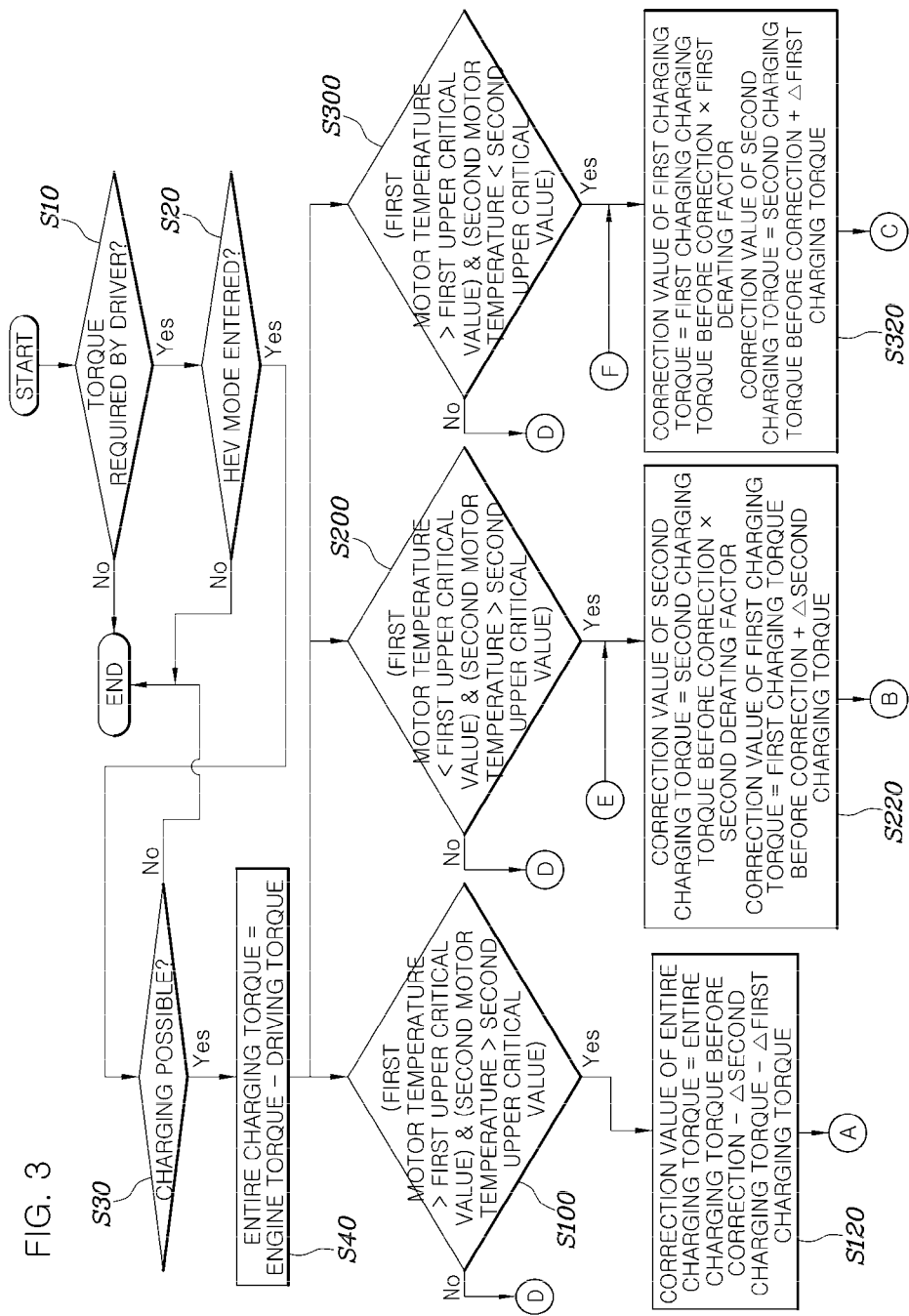
FIGS. 3, 4, and 5 are flowcharts showing a method of controlling charging torque of a hybrid vehicle according to an exemplary embodiment of the present disclosure.
Figure 4:
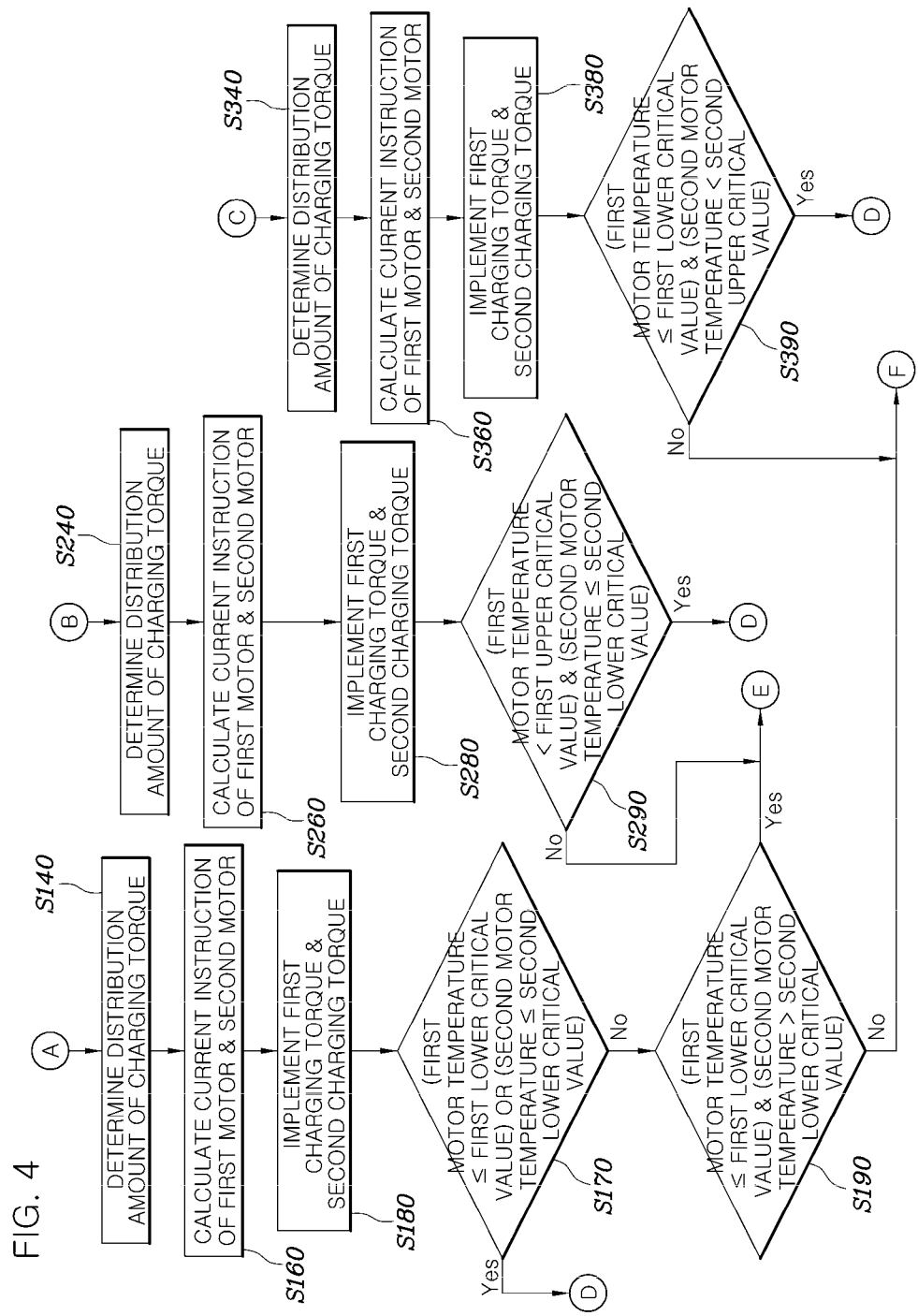
Figure 5:
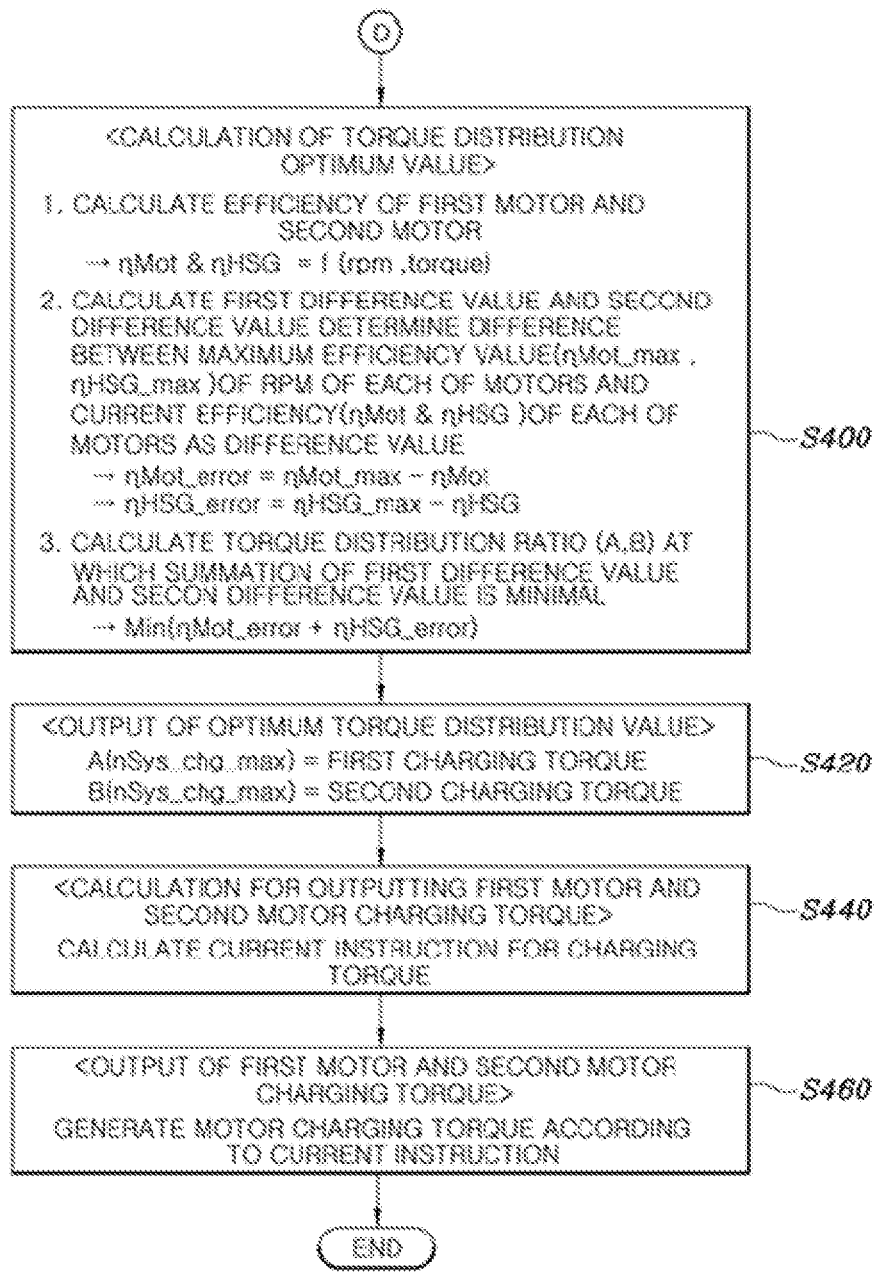
Figure 6:
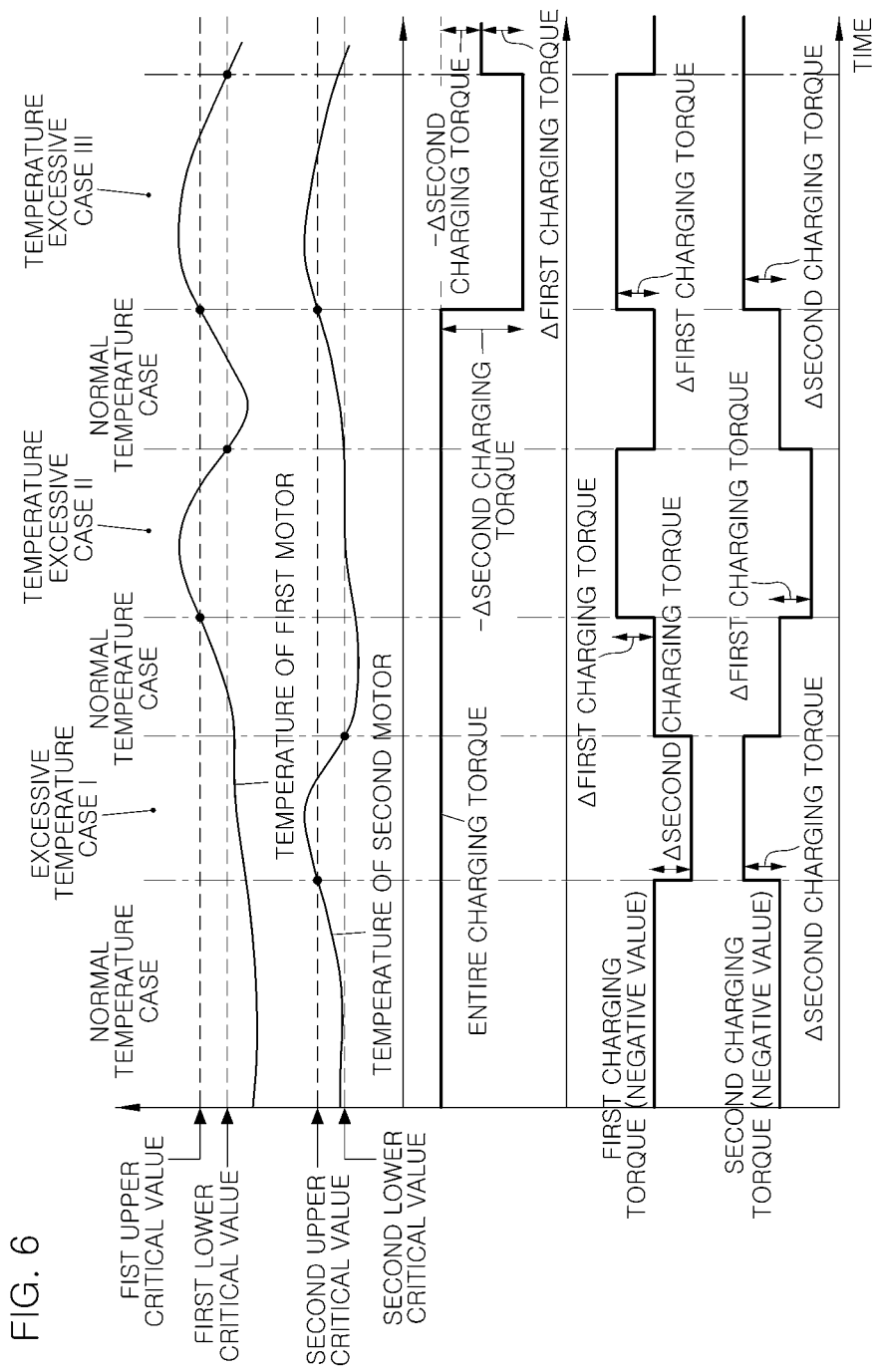
FIG. 6 is a diagram showing a charging scenario according to a system for controlling charging torque of a hybrid vehicle according to an exemplary embodiment of the present disclosure.

FIG. 1 is a diagram showing a system for controlling charging torque of a hybrid vehicle according to an exemplary embodiment of the present disclosure, FIG. 2 is a graph showing a system for controlling charging torque of a hybrid vehicle according to an exemplary embodiment of the present disclosure, FIGS. 3 to 5 are flowcharts showing a method of controlling charging torque of a hybrid vehicle according to an exemplary embodiment of the present disclosure, and FIG. 6 is a diagram showing a charging scenario according to a system for controlling charging torque of a hybrid vehicle according to an exemplary embodiment of the present disclosure.

A system for controlling charging torque of a hybrid vehicle according to one exemplary embodiment of the present disclosure, as shown in FIG. 1, may include: a first motor 20 connected to an engine 10 and charging an energy storage system (ESS) 50 using first charging torque generated from the engine 10; a second motor 30 connected to the engine 10 and charging the energy storage system 50 using second charging torque generated from the engine 10; a plurality of sensors (not shown) respectively sensing operation states of the first motor 20 and the second motor 30; and a controller 100 configured to obtain the entire charging torque generated from the engine 10 and determine the distribution amounts of the first charging torque and the second charging torque from the entire charging torque or adjust the entire charging torque on the basis of the operation states of the first motor 20 and the second motor 30.

The first motor 20 is connected to the engine (e.g., ICE) 10 through a clutch 15. The first motor 20 drives a vehicle in cooperation with the engine 10 or is independently connected to a transmission 70 to be able to implement an EV mode. The energy storage system (ESS) 50 is connected to a driving line through an inverter 60. The energy storage system 50 is a device that stores electrical energy such as a battery, a capacitor, etc. The second motor 30 is connected to the energy storage system 50 through an inverter 40. The second motor 30 is connected to the engine 10 to start the engine 10 and also can perform charging using engine power. The controller 100 generally controls the entire vehicle including the engine 10, the motors 20 and 30, the inverters 40 and 60, and the energy storage system 50. The controller 100 according to an exemplary embodiment of the present disclosure may be composed of sub-controllers (an engine controller, a motor controller, a battery controller, etc.) corresponding to modules, respectively, and the sub-controllers can perform control in communication with one another.

The controller 100 according to an exemplary embodiment of the present disclosure may be implemented through a non-transitory memory (not shown) configured to store data with respect to algorithms configured to control operations of various components in the vehicle or software instructions reproducing the algorithms, and a processor (not shown) configured to perform the operations described hereinafter by using the data stored in the memory. Herein, the memory and the processor may be implemented as separate chips. Alternatively, the memory and the processor may be implemented as a single chip integrated with each other. The processor may take the form of one or more processor(s).

In detail, the plurality of sensors respectively sense the operation states of the first motor 20 and the second motor 30 and the controller 100 obtains the entire charging torque generated from the engine 10 and determines the distribution amounts of the first charging torque and the second charging torque from the entire charging torque or adjusts the entire charging torque on the basis of the operation states of the first motor 20 and the second motor 30. The entire charging torque is a value obtained by subtracting driving torque for driving a vehicle from engine torque generated from an engine and may be the summation of the first charging torque and the second charging torque. The controller 100 may obtain the driving torque and the engine torque using various sensors.

The plurality of sensors may sense temperatures of the first motor 20 and the second motor 30, respectively, and the controller 100 may determine the distribution amounts of the first charging torque and the second charging torque or may adjust the entire charging torque on the basis of the temperatures of the first motor 20 and the second motor 30. The plurality of sensors may be temperature sensors disposed in the first motor 20 and the second motor 30, and may estimate temperature of a motor from cooling water or may estimate temperature of a motor from other data values of the motor.

In detail, FIGS. 3 to 5 are flowcharts showing a method of controlling charging torque of a hybrid vehicle according to an exemplary embodiment of the present disclosure, in which the controller 100 can determine the distribution amounts such that the first charging torque decreases and the second charging torque increases when a temperature of the first motor 20 exceeds a first predetermined reference. That is, the fuel efficiency is the highest when an engine is operated toward an optimum point and it is advantageous in some cases to store redundant energy except for driving torque, which is required by a driver, using motors in accordance with the operation at the optimum point. In this case, it is the simplest method to use only the first motor 20, but depending on cases, the current RPM is not the optimum RPM for charging and the charging efficiency is deteriorated when the first motor 20 is overheated, so it is most effective to use both the first motor 20 and the second motor 30 for charging. To this end, when a temperature of the first motor 20 exceeds a first predetermined reference, the controller 100 determines the distribution amounts such that the first charging torque decreases and the second charging torque increases, thereby complementing the efficiency of the first motor 20 and protecting the first motor 20.

In detail, when a temperature of the first motor 20 exceeds a predetermined first reference, the controller 100 can decrease the first charging torque by a first derating factor and increase the second charging torque by the reduced first charging torque. That is, a first predetermined reference is applied when the first charging torque of the first motor 20 is decreased. FIG. 2 is a graph showing a system for controlling charging torque of a hybrid vehicle according to an exemplary embodiment of the present disclosure, in which a charging ratio of a motor according to temperature. As shown in the figures, the higher the temperature, the lower the charging efficiency of a motor, so the charging torque is derated at a predetermined ratio at a predetermined temperature or more. According to the present disclosure, derating is prepared in advance by setting a lower critical value and an upper critical value before a temperature at which derating is started, and stability of control is secured by setting a hysteresis period.

Similarly, as for the second motor 30, when a temperature of the second motor 30 exceeds a second predetermined reference, the controller 100 can determine the distribution amounts such that the second charging torque decreases and the first charging torque increases. Similar to the first motor 20, when a temperature of the second motor 30 exceeds a second predetermined reference, the controller 100 can decrease the second charging torque by a second derating factor and increase the first charging torque by the reduced second charging torque.

Although the temperatures of the motors are the basis of determination in an exemplary embodiment of the present disclosure, various factors other than temperature such as aging or output may be used as the basis of determination. It is assumed in exemplary embodiments to be described below that the controller 100 decreases the entire charging torque when both temperatures of the first motor 20 and the second motor 30 do not exceed a second predetermined reference.

In detail, a method of controlling charging torque of a hybrid vehicle using the system for controlling charging torque of a hybrid vehicle of the present disclosure includes: obtaining the entire charging torque generated from an engine 10; sensing the operation state of the first motor 20; sensing the operation state of the second motor 30; and determining distribution amounts of the first charging torque and the second charging torque from the entire charging torque or adjusting the entire charging torque on the basis of the operation states of the first motor 20 and the second motor 30.

When there is a torque demand for a vehicle from a driver (S10), as shown in FIG. 3, whether it is a hybrid mode is determined (S20). When the vehicle is controlled in the hybrid mode, whether the energy storage system 50 is not current fully charged and charging is possible is checked (S30). If charging is possible, the entire charging torque may be considered as torque corresponding to a value obtained by subtracting driving torque required by a driver from engine torque currently output from the engine 10 (S40).

The states of the motors are checked by measuring temperatures thereof before charging is started. If the temperature of the first motor 20 exceeds a predetermined first upper critical value and the temperature of the second motor 30 also exceeds a second upper critical value (S100), the controller 100 determines that both temperatures of the first motor 20 and the second motor 30 exceed first and second predetermined references, respectively, so the controller 100 can decrease the first charging torque by a first derating factor, decrease the second charging torque by a second derating factor, and decrease the engine torque by the reduced first charging torque and second charging torque (S120). Accordingly, entire charging torque with the reduction of the first charging torque and the reduction of the second charging torque removed from the entire charging torque before correction is obtained. The engine torque is controlled to be decreased by the reduced entire charging torque.

When charging torque has been distributed to the motors, current instructions for the motors are calculated and the motors perform the distributed charging through current control. The temperatures of the motors are measured again and the following control is performed (S140, S160, S180, S170, and S190).

If the first motor 20 is normal but the temperature of the second motor 30 is excessive (S200), second charging torque is obtained by multiplying the second charging torque before correction by a second derating factor obtained from the graph shown in FIG. 2 (S220). First charging torque of the first motor 20 is obtained by adding the reduction of the second charging torque to the first charging torque before correction, whereby the entire charging amount is maintained, but charging by the motor having high temperature is decreased, thereby protecting the motor. When the motor is protected, the use time of the motor is increased, so it becomes easy to secure the entire charging efficiency and charging amount. For the first derating factor and the second derating factor, the graph shown in FIG. 2 having experimental values for motors is prepared and stored in advance in the controller 100.

Accordingly, as described above, charging is performed after determining the charging torque distribution amounts and generating a current instruction, and then subsequent charging control is performed by measuring again the temperatures of the motors (S240, S260, S280, and S290).

If the temperature of the second motor 30 is normal and the temperature of the first motor 20 is too high (S300), similarly, the first charging torque of the first motor 20 is reduced by the first derating factor and the derated charging amount is compensated for through the second motor 30 (S320).

By repeating these processes, both motors are appropriately used until the temperature of the motor having high temperature is stabilized, and when the temperatures of both the motors are stabilized, optimum control is performed, as shown in FIG. 5.

Efficiency according to the current RPM and torque of the motors is calculated first when the temperatures of the first motor 20 and the second motor 30 are stabilized. An efficiency map for the calculation is obtained through experiments and stored in advance in the controller 100. The maximum efficiency of the current RPM of the motors is calculated, and a first difference value and a second deference value that are the difference values between the current efficiency and the maximum efficiency are derived. That is, when the controller 100 determines that the operation states of the first motor 20 and the second motor 30 are in a good state (e.g., temperatures of the first and second motors 20 and 30 are below or equal to the first and second upper critical values, respectively), the controller 100 calculates a first difference value that is the difference value between first maximum efficiency according to the RPM of the first motor 20 and the efficiency of the first motor 20 and calculates a second difference value that is the difference value between the second maximum efficiency according to the RPM of the second motor 30 and the efficiency of the second motor 30 (S400).

The distribution ratios of the first charging torque and the second charging torque are determined such that the summation of the first difference value and the second difference value is minimal (S420). Current instructions are determined in accordance with the distributed charging torque, respectively, and then charging is performed (S440 and S460).

FIG. 6 is a diagram showing a charging scenario according to a system for controlling charging torque of a hybrid vehicle according to an exemplary embodiment of the present disclosure. As shown in the scenario, the first charging torque and the second charging torque are controlled by optimum control at a normal temperature. When the temperature of the second motor 30 is high (first case), the second charging torque is decreased. Since charging torque of the motors is a negative value, it is shown as rising in the graph. Further, the first charging torque is correspondingly increased. When the high temperature of the second motor 30 drops to a second lower critical value, the method returns to normal temperature control. A second case is the case in which the temperature of the first motor 20 is too high. In this case, the first charging torque is reduced and the second charging torque is correspondingly increased.

Finally, a third case is the case in which the temperatures of both motors are high, and in this case, it can be seen that the entire charging torque is decreased by reducing both the first charging torque and the second charging torque. Further, it can be seen that since the temperature of the first motor 20 dropped first, the first charging torque is returned first.

According to the system and method of controlling charging torque of a hybrid vehicle of the present disclosure, it is possible to improve charging efficiency, prevent overheating of motors, and stably perform charging even if the motors are overheated.

The foregoing descriptions of specific exemplary embodiments of the present disclosure have been presented for purposes of illustration and description. They are not intended to be exhaustive or to limit the inventive concept(s) to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the inventive concept(s) be defined by the Claims appended hereto and their equivalents.

What is claimed is:

1. A system for controlling a charging torque of a hybrid vehicle, the system comprising:
    a first motor connected to an engine and configured to charge an energy storage system using a first charging torque generated from the engine;
    a second motor connected to the engine and configured to charge the energy storage system using a second charging torque generated from the engine;
    a plurality of sensors for respectively sensing operation states of the first motor and the second motors; and
    a controller configured to obtain an entire charging torque generated from the engine, and to determine distribution amounts of the first charging torque and the second charging torque from the entire charging torque or to adjust the entire charging torque according to the operation states of the first motor and the second motor,
    wherein the plurality of sensors sense a temperature of the first motor and a temperature of the second motor, respectively, and
    wherein when the temperature of the second motor exceeds a second predetermined reference, the controller is further configured to determine the distribution amounts of the first charging torque and the second charging torque such that the second charging torque decreases and the first charging torque increases.

2. The system of claim 1, wherein the first motor is disposed on a driving shaft of the vehicle and is connected to the engine through a clutch.

3. The system of claim 1, wherein the entire charging torque is a value obtained by subtracting a driving torque for driving the vehicle from an engine torque generated from the engine and is a summation of the first charging torque and the second charging torque.

4. The system of claim 1, wherein the controller is configured to determine the distribution amounts of the first charging torque and the second charging torque or to adjust the entire charging torque according to the temperatures of the first motor and the second motor.

5. The system of claim 4, wherein when the temperature of the first motor exceeds a first predetermined reference, the controller is further configured to determine the distribution amounts of the first charging torque and the second charging torque such that the first charging torque decreases and the second charging torque increases.

6. The system of claim 1, wherein when the temperature of the first motor exceeds a first predetermined reference, the controller is further configured to reduce the first charging torque by a first derating factor and to increase the second charging torque by the reduced first charging torque.

7. The system of claim 1, wherein when the temperature of the second motor exceeds the second predetermined reference, the controller is further configured to reduce the second charging torque by a second derating factor and to increase the first charging torque by the reduced second charging torque.

8. The system of claim 1, wherein when the temperature of the first motor and the temperature of the second motor exceed a first predetermined reference and the second predetermined reference, respectively, the controller is further configured to reduce the entire charging torque.

9. The system of claim 1, wherein when the temperatures of the first motor and the second motor exceed a first predetermined reference and the second predetermined reference, respectively, the controller is further configured to reduce the first charging torque by a first derating factor, to reduce the second charging torque by a second derating factor, and to reduce an engine torque by the reduced first charging torque and second charging torque.

10. The system of claim 1, wherein when the controller determines that the operation states of the first motor and the second motor are in a good operation state, the controller is further configured to:
calculate a first difference value that is a difference value between a first maximum efficiency according to an RPM of the first motor and an efficiency of the first motor,
calculate a second difference value that is a difference value between a second maximum efficiency according to an RPM of the second motor and an efficiency of the second motor, and
determine the first charging torque and the second charging torque such that a summation of the first difference value and the second difference value is minimal,
wherein the good operation state includes an operation state where the temperature of the first motor and the temperature of the second motor are below or equal to a first predetermined reference and the second predetermined reference, respectively.

11. A method of controlling a charging torque of a hybrid vehicle using the system of claim 1, the method comprising:
obtaining an entire charging torque generated from an engine;
sensing an operation state of a first motor;
sensing an operation state of a second motor; and
determining distribution amounts of first charging torque and second charging torque from the entire charging torque or adjusting the entire charging torque according to the operation states of the first motor and the second motor.

* * * * *